Figure 3:
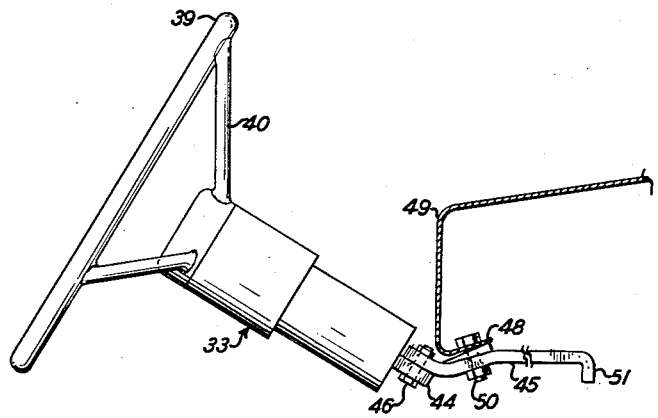

Dec. 13, 1960
D. LARSEN
2,963,919
RIGHT HAND CONVERSION STEERING CONTROL FOR AUTOMOBILES
Filed Jan. 12, 1959
2 Sheets-Sheet 1
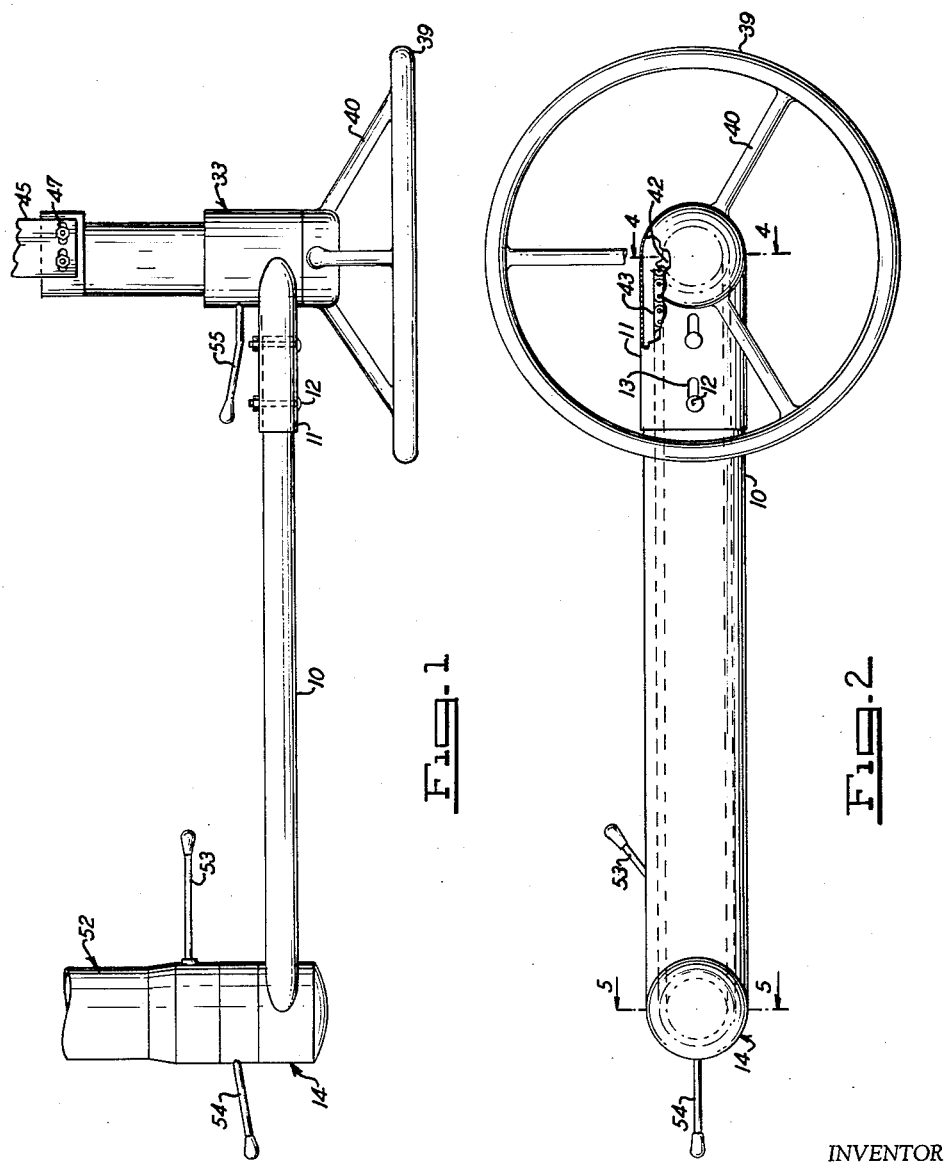
INVENTOR
DAHL LARSEN Dec. 13, 1960　　　　　　D. LARSEN　　　　　　2,963,919
RIGHT HAND CONVERSION STEERING CONTROL FOR AUTOMOBILES
Filed Jan. 12, 1959　　　　　　　　　　　2 Sheets-Sheet 2

INVENTOR
DAHL LARSEN
BY Jacobi & Jacobi
ATTORNEYS

United States Patent Office 2,963,919
Patented Dec. 13, 1960

2,963,919

RIGHT HAND CONVERSION STEERING CONTROL FOR AUTOMOBILES

Dahl Larsen, 500 Sacramento St., Nevada City, Calif.

Filed Jan. 12, 1959, Ser. No. 786,299

9 Claims. (Cl. 74—494)

This invention relates to automobiles and control systems therefore and more particularly to a right hand conversion steering control which may be utilized for converting an automobile from a conventional left hand drive to a right hand drive and vice-versa.

Heretofore, numerous control systems have been proposed and utilized for converting an automobile from a conventional left hand drive to a dual drive in which right and left hand steering wheels are provided and which, in some instances, also provide duplicate clutch, brake and accelerator controls on the right hand side in order that the automobile may be operated by a person seated either at the right or left. These systems have primarily been utilized in automobiles intended for driver instruction purposes and in most cases the installation of the dual drive system requires such extensive modifications to the automobile that convenient conversion back to a single left hand drive is not feasible both from an economic standpoint and also from the standpoint of appearance, since in the installation of these systems, it is necessary to drill numerous holes in the instrument panel and firewall and covering or masking of these holes upon removal of the equipment is sometimes exceedingly difficult. Moreover, these prior art systems were relatively complicated and could not be conveniently installed on the vehicle without the services of a trained mechanic and installation and removal thereof required an appreciable period of time as well as considerable manual effort.

It is well known that in some instances, a right hand drive in an automobile is far more convenient than the conventional left hand drive and this is particularly true in the case of persons making deliveries by automobile and particularly mail deliveries where the mailman normally stops on the right hand side of the road and must insert mail in mail boxes situated at the right hand side of the road. When utilizing a conventional left hand drive vehicle, the mailman must slide across the seat from the driver's position in order to insert the mail in the mail boxes and obviously, this is inconvenient and time consuming as well as exceedingly inconvenient, particularly where the seat cushion is of plush or other similar material which offers considerable resistance to sliding thereon. Also in the case of rural mailmen, it is quite common for him to utilize his own car for making mail deliveries and after completion of his delivery duties, he frequently desires to use the automobile for pleasure purposes and for such uses, the conventional left hand drive is of course preferable. Consequently, the installation of a permanent right hand drive in such an automobile is not satisfactory since the right hand portion thereof has no utility except while making deliveries and is inconvenient and in the way when utilizing the automobile for pleasure purposes. The prior art dual controls referred to above cannot be conveniently installed and removed and consequently these mechanisms are not particularly suitable for frequently converting an automobile from left to right hand drive and vice-versa.

It is accordingly an object of the invention to provide a right hand conversion steering control for automobiles which may be conveniently installed by simply removing the conventional steering wheel and by providing a single mounting hole in the lower flange of the instrument panel or in the firewall to permit attachment of a bracket and which conversion may be accomplished within a matter of minutes.

A further object of the invention is the provision of a right hand conversion steering control for automobiles which may be conveniently attached to the conventional shaft merely by removing the conventional steering wheel and which is provided with means for conveniently attaching a portion of the device to the steering shaft and for forcibly withdrawing the same therefrom.

A still further object of the invention is the provision of a right hand conversion steering control for automobiles in which means is provided to permit adjustment of the position of the right hand steering wheel in accordance with individual requirements.

Another object of the invention is the provision of a right hand conversion steering control for automobiles which may be conveniently installed and removed and in which all of the moving parts with the exception of the steering wheel are completely enclosed.

A further object of the invention is the provision of a right hand conversion steering control for automobiles in which controls for direction signals and horn are provided for the right hand drive position.

A still further object of the invention is the provision of a right hand conversion steering control for automobiles in which the entire mechanism comprises a single unit which may be installed or removed from an automobile by a relatively unskilled person and without requiring the use of special tools.

Figures 4, 5:
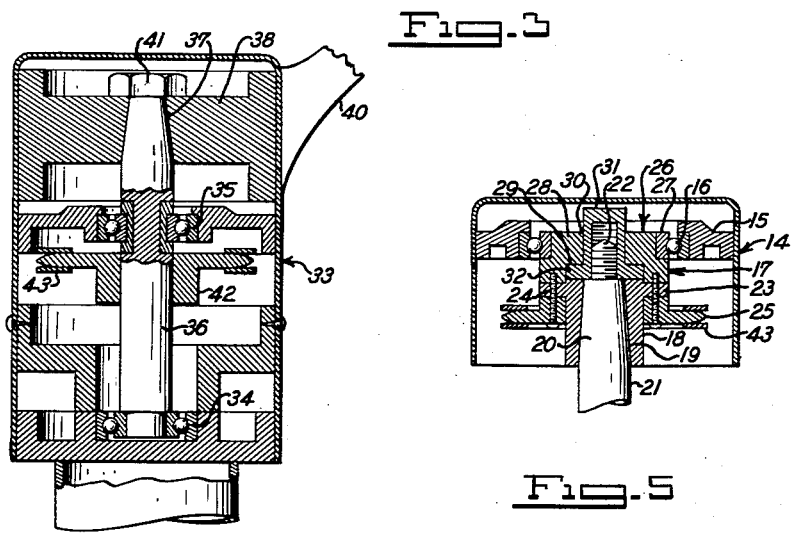

Further objects and advantages of the invention will be apparent from the following description taken in conjunction with the accompanying drawings wherein:

Fig. 1 is a top plan view of a right hand conversion steering control constructed in accordance with this invention and attached to the conventional steering shaft and steering column;

Fig. 2 a front elevational view of the apparatus shown in Fig. 1;

Fig. 3 an end elevational view with parts in section for greater clarity and showing the manner in which the steering control is secured to the instrument panel or firewall of the automobile;

Fig. 4 a fragmentary sectional view taken substantially on the line 4—4 of Fig. 2; and Fig. 5 a fragmentary sectional view taken substantially on the line 5—5 of Fig. 2.

With continued reference to the drawings, there is shown a right hand conversion steering control for automobiles constructed in accordance with this invention which control may well comprise an elongated hollow arm 10 provided at one end with a telescoping sleeve 11 secured to the arm 10 in adjusted position by means of screw threaded or other suitable fastening means 12 extending through slots 13 in the sleeve 11. This structure provides for convenient adjustment of the length of the arm 10.

Secured to one end of the arm 10 as best shown in Figs. 1 and 5 is an inverted cup shaped housing 14 within which is fixed a bearing race 15. Rotatably carried by anti-friction bearings 16 on the bearing race 15 is a hub 17 which includes a sleeve 18 having a tapered bore 19 for engaging the tapered upper end 20 of a conventional automobile steering shaft 21. The steering shaft 21 is also provided at the upper end with a threaded portion 22 for receiving a nut to secure the conventional automobile steering wheel in place on the shaft 21. The sleeve 18 is provided with an annular flange 23 and secured to this flange as by screw threaded fastening means or the like 24 is a sprocket 25. Also secured to the flange 23 by the fastening means 24 is a member 26 which serves to mount the inner bearing race 27 and is also provided with an inwardly projecting annular flange 28 which provides an annular recess 29 adjacent the upper end of the sleeve 18. The member 26 is also provided with a bore 30 communicating with the annular recess 29 and rotatably disposed in the bore 30 is a nut 31 having an annular flange 32 disposed in the annular recess 29.

It will thus be seen that upon removal of the conventional steering wheel from the steering shaft 21 that the sleeve 18 may be positioned over the tapered end 20 of the steering shaft 21 and upon threaded engagement of the nut 31 with the threaded end 22 of the shaft 21, rotation of the nut 31 will serve to force the sleeve 18 into tight engagement with the tapered portion 20 of the steering shaft 21. When it is desired to remove the sleeve 18 and associated apparatus from the steering shaft 21, it is only necessary to rotate the nut 31 in the opposite direction which will result in the flange 32 engaging the upper wall of the annular recess 29 which will then operate to withdraw the sleeve 18 from the tapered end 20 of the steering shaft 21. Thus, the device of this invention may be applied to the steering shaft or removed therefrom in a matter of moments and without requiring the use of special tools other than a simple wrench to engage the nut 31.

Secured to the opposite end of the arm 10 from the cup shaped housing 14 is an elongated tubular post 33 within which as best shown in Fig. 4, is mounted spaced anti-friction bearings 34 and 35. A stub shaft 36 is rotatably carried by the bearings 34 and 35 and the upper end of the shaft 36 may be provided with a tapered portion 37 for receiving the tapered bore in a hub 38 of a steering wheel 39 connected to the hub 38 by spokes 40. The hub 38 and steering wheel 39 may be secured in place on the stub shaft 36 by a suitable nut or other fastening means 41. A sprocket 42 is fixed on the stub shaft 36 between the bearings 34 and 35 and trained over the sprocket 42 and the sprocket 25 and extending through the hollow arm 10 is a drive chain 43.

The lower end of the tubular post 33 may be provided with a mounting lug 44 and a suitable mounting bracket 45 may be adjustably attached to the lug 44 by screw threaded or other suitable fastening means 46 extending through the lug 44 and through slots 47 in the bracket 45. The bracket 45 may, as shown in Fig. 3, be secured to the lower flange 48 of the instrument panel 49 of the automobile by screw threaded fastening means or the like 50 and the bracket 45 may also be provided with an angularly disposed end 51 which in certain installations may be attached to the firewall of the vehicle in any desired manner.

As shown in Figs. 1 and 2, the conventional steering column 52 of the automobile is provided with the conventional transmission control lever 53 and there may be also provided a conventional directional signal control 54. It is not necessary to provide a transmission control lever on the post 33 at the right hand driving position since with present day automatic transmissions, it is only necessary to operate the transmission control lever 53 to place the transmission in drive condition whereafter movement of the automobile is controlled solely by the accelerator and brakes. However, for convenience there has been provided a directional signal control 55 on the post 33 at the right hand driving position.

It will thus be seen that simply by removing the conventional steering wheel of the vehicle that the cup shaped housing 14 and sleeve 18 may be applied to the steering shaft 21 of the automobile and secured in place thereon and the post 33 secured to the instrument panel 49 of the vehicle by means of the mounting lug 44 and bracket 45, whereupon the vehicle may be steered from the right hand position merely by manipulating the steering wheel 39 which drives the steering shaft 21 through the sprockets 42 and 25 and the chain 43. This apparatus may be conveniently removed and the conventional steering wheel installed on the steering shaft 21 to provide a conventional left hand drive automobile.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A right hand conversion steering control for automobiles, said control comprising an elongated hollow arm, means for adjusting the length of said arm, an inverted cup shaped housing secured to one end of said arm, a bearing mounted in said housing, a hub rotatably carried by said bearing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, spaced bearings fixed in said post, a stub shaft rotatably carried by said last named bearings, a sprocket fixed on said stub shaft between said last named bearings, a steering wheel fixed to the upper end of said stub shaft, the lower end of said stub shaft terminating within said post, a drive chain extending through said arm and engaging said sprockets, a manually operable directional signal control on said post, a mounting lug on the lower end of said post and a mounting bracket adjustably secured to said lug for attaching said post to the automobile, whereby said control may be substituted for the conventional steering wheel to provide a right hand drive automobile and removed at will to permit restoration of the conventional left hand drive.

2. A right hand conversion steering control for automobiles, said control comprising an elongated hollow arm, an inverted cup shaped housing secured to one end of said arm, a bearing mounted in said housing, a hub rotatably carried by said bearing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, spaced bearings fixed in said post, a stub shaft rotatably carried by said last named bearings, a sprocket fixed on said stub shaft between said last named bearings, a steering wheel fixed to the upper end of said stub shaft, the lower end of said stub shaft terminating within said post, a drive chain extending through said arm and engaging said sprockets, a manually operable directional signal control on said post, a mounting lug on the lower end of said post and a mounting bracket adjustably secured to said lug for attaching said post to the automobile, whereby said control may be substituted for the conventional steering wheel to provide a right hand drive automobile and removed at will to permit restoration of the conventional left hand drive.

3. A right hand conversion steering control for automobiles, said control comprising an elongated hollow arm, an inverted cup shaped housing secured to one end of said arm, a bearing mounted in said housing, a hub rotatably carried by said bearing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, spaced bearings fixed in said post, a stub shaft rotatably carried by said last named bearings, a sprocket fixed on said stub shaft between said last named bearings, a steering wheel fixed to the upper end of said stub shaft, the lower end of said stub shaft terminating within said post, a drive chain extending through said arm and engaging said sprockets, a mounting lug on the lower end of said post and a mounting bracket adjustably secured to said lug for attaching said post to the automobile, whereby said control may be substituted for the conventional steering wheel to provide a right hand drive automobile and removed at will to permit restoration of the conventional left hand drive.

4. A right hand conversion steering control for automobiles, said control comprising an elongated hollow arm, an inverted cup shaped housing secured to one end of said arm, a bearing mounted in said housing, a hub rotatably carried by said bearing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, spaced bearings fixed in said post, a stub shaft rotatably carried by said last named bearings, a sprocket fixed on said stub shaft between said last named bearings, a steering wheel fixed to the upper end of said stub shaft, a drive chain extending through said arm and engaging said sprockets, a mounting lug on the lower end of said post and a mounting bracket adjustably secured to said lug for attaching said post to the automobile, whereby said control may be substituted for the conventional steering wheel to provide a right hand drive automobile and removed at will to permit restoration of the conventional left hand drive.

5. A right hand conversion steering control for automobiles, said control comprising an elongated hollow arm, an inverted cup shaped housing secured to one end of said arm, a hub rotatably carried by said housing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, spaced bearings fixed in said post, a stub shaft rotatably carried by said last named bearings, a sprocket fixed on said stub shaft between said last named bearings, a steering wheel fixed to the upper end of said stub shaft, a drive chain extending through said arm and engaging said sprockets, a mounting lug on the lower end of said post and a mounting bracket adjustably secured to said lug for attaching said post to the automobile, whereby said control may be substituted for the conventional steering wheel to provide a right hand drive automobile and removed at will to permit restoration of the conventional left hand drive.

6. A right hand conversion steering control for automobiles, said control comprising an elongated hollow arm, an inverted cup shaped housing secured to one end of said arm, a hub rotatably carried by said housing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, a stub shaft rotatably mounted in said post, a sprocket fixed on said stub shaft, a steering wheel fixed to the upper end of said stub shaft, a drive chain extending through said arm and engaging said sprockets, a mounting lug on the lower end of said post and a mounting bracket adjustably secured to said lug for attaching said post to the automobile, whereby said control may be substituted for the conventional steering wheel to provide a right hand drive automobile and removed at will to permit restoration of the conventional left hand drive.

7. A right hand conversion steering control for automobiles, said control comprising an elongated hollow arm, an inverted cup shaped housing secured to one end of said arm, a hub rotatably carried by said housing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, a stub shaft rotatably mounted in said post, a sprocket fixed on said stub shaft, a steering wheel fixed to the upper end of said stub shaft, a drive chain extending through said arm and engaging said sprockets and means on said post for attaching said post to the automobile, whereby said control may be substituted for the conventional steering wheel to provide a right hand drive automobile and removed at will to permit restoration of the conventional left hand drive.

8. A right hand conversion steering control for automobiles, said control comprising an elongated hollow arm, a housing secured to one end of said arm, a hub rotatably carried by said housing, said hub including a sleeve having a tapered bore for engaging the tapered upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said tapered upper end or withdrawn therefrom, an elongated tubular post mounted on the opposite end of said arm, a stub shaft rotatably mounted in said post, a sprocket fixed on said stub shaft, a steering wheel fixed to the upper end of said stub shaft, a drive chain extending through said arm and engaging said sprockets and means on said post for attaching said post to the automobile, whereby said control may be substituted for the conventional steering wheel to provide a right hand drive automobile and removed at will to permit restoration of the conventional left hand drive.

9. A right hand conversion steering control for automobiles, said control comprising an elongated hollow arm, a housing secured to one end of said arm, a hub rotatably carried by said housing, said hub including a sleeve having a bore for engaging the upper end of a conventional automobile steering shaft, a sprocket fixed to said sleeve, a nut rotatably mounted in said hub but fixed against axial movement with respect to said sleeve, whereby upon threaded engagement of said nut with the threaded upper end of said steering shaft said sleeve may be forced onto said upper end or withdrawn therefrom, an elongated tubular post mounted on the opposite end of said arm, a stub shaft rotatably mounted in said post, a sprocket fixed on said stub shaft, a steering wheel fixed to the upper end of said stub shaft, a drive chain extending through said arm and engaging said sprockets and means on said post for attaching said post to the automobile, whereby said control may be substituted for the conventional steering wheel to provide a right hand drive automobile and removed at will to permit restoration of the conventional left hand drive.

References Cited in the file of this patent

UNITED STATES PATENTS 2,644,858     Small _____ July 7, 1953

FOREIGN PATENTS 667,775     France _____ June 25, 1929